United States Patent [19]
Mollett et al.

[11] Patent Number: 5,912,752
[45] Date of Patent: Jun. 15, 1999

[54] METHOD AND APPARATUS FOR IMPROVING SERIAL INFRARED ASYNCHRONOUS COMMUNICATION PERFORMANCE

[75] Inventors: Victor Linn Mollett, Lexington, Ky.; Toshio Seo, Twinsburg, Ohio; Jason Eric Waldeck, Lexington, Ky.

[73] Assignee: Lexmark International, Inc., Lexington, Ky.

[21] Appl. No.: 08/670,972

[22] Filed: Jun. 26, 1996

[51] Int. Cl.$^6$ .................................................. H04J 14/08
[52] U.S. Cl. .......................... 359/137; 359/110; 359/152; 359/163; 359/154; 359/145
[58] Field of Search ............................... 359/137, 154, 359/152, 143, 145, 110, 113, 167, 174, 138, 163; 340/825.57; 341/178

[56] References Cited

U.S. PATENT DOCUMENTS

| | | | |
|---|---|---|---|
| 4,200,936 | 4/1980 | Borzcik et al. | 364/900 |
| 4,597,073 | 6/1986 | Staples | 370/24 |
| 5,075,792 | 12/1991 | Brown et al. | 359/152 |
| 5,081,711 | 1/1992 | Rickman, Jr. | 359/146 |
| 5,214,526 | 5/1993 | Tonomura | 359/184 |
| 5,237,663 | 8/1993 | Srinivasan | 395/325 |
| 5,247,380 | 9/1993 | Lee et al. | 359/118 |
| 5,255,111 | 10/1993 | Kwa | 359/152 |
| 5,309,351 | 5/1994 | McCain et al. | 364/132 |
| 5,321,542 | 6/1994 | Freitas et al. | 359/172 |
| 5,394,259 | 2/1995 | Takahara | 359/142 |
| 5,475,381 | 12/1995 | Williamson et al. | 340/825.57 |
| 5,519,527 | 5/1996 | Panton | 359/163 |
| 5,557,751 | 9/1996 | Banman et al. | 359/154 |
| 5,585,952 | 12/1996 | Imai et al. | 359/152 |
| 5,706,110 | 1/1998 | Nykanen | 359/110 |
| 5,734,487 | 3/1998 | Rossi | 359/145 |

FOREIGN PATENT DOCUMENTS

| | | | |
|---|---|---|---|
| 2301264 | 11/1996 | United Kingdom | H04L 29/10 |
| WO 96/12358 A1 | 4/1996 | WIPO . | |

*Primary Examiner*—Jeffery A. Hofsass
*Assistant Examiner*—John Tweel, Jr.
*Attorney, Agent, or Firm*—John A. Brady

[57] ABSTRACT

Disclosed is an improved hardware approach for increasing the efficiency of infrared asynchrounous communication performance. By utilizing the Infrared Data Association's Serial Infrared Link Access Protocol (IRLAP) along with hardware assist, and DMA associated with most microprocessors, e.g. conventional PC's, the processor is free to carry out other functions without having to process the IR communications for both transmit and receive.

17 Claims, 7 Drawing Sheets

METHOD AND APPARATUS FOR IMPROVING SERIAL INFRARED ASYNCHRONOUS COMMUNICATION PERFORMANCE

BACKGROUND OF THE INVENTION

1. Field of the Invention

The present invention relates to communication apparatus and more particularly relates to infrared communication apparatus designed to free up the local processor of computers or peripherals, for example either or both of a personal computer or a printer employing a local processor.

2. Description of Related Art

The Infrared Data Association (IRDA) was established to standardize communications between mobile devices. A family of specifications was developed by which computers and peripheral could be interconnected via a half duplex serial infrared physical link. IRDA's Serial Infrared Link Access Protocol (IRLAP) specifies the low-level data link layer protocol on which other protocols are based. IRLAP is an adaptation of existing'byte-based, synchronous serial protocols (HDLC and SDLC) to an asynchronous format. This asynchronous adaptation was chosen because of the established universal asynchronous receiver/transmitter (UART) chip sets used in personal computers worldwide. These serial devices can communicate by means of infrared (IR) pulses simply by the addition of an infrared modulator/demodulator (modem).

The IRLAP protocol uses the concept of a frame for asynchronous communications. In order to meet IRDA compliance, each frame must be constructed and passed a byte at a time to the UART for transmittal. Construction of a frame comprises four primary tasks:

1. The addition of beginning flag(s) (BOF's), marking the start of a frame.
2. The special encoding of certain data bytes that otherwise would appear to be flags. This is known as transparency. A byte-stuffing technique is used in which data bytes that have the same value as a control or flag byte are replaced by special two-byte sequences.
3. The addition of a 16-bit frame check sequence. This is calculated using the cyclic redundancy check (CRC[1]) to ensure data integrity.

[1] A process or character used to check the integrity of a block of data. A CRC character is generated at the transmission end. It's value depends on the hexadecimal value of the number of 1's in data block, which the transmitting device calculates and appends to the data block. At the receiving end, if the calculation does not match an error message is sent back to the transmitter and the data is requested to be resent.

4. The appending of an end of frame flag (EOF), marking the end of a frame. Upon reception of a frame, the receiving station must reconstruct the frame, ensure data integrity, and then pass the data to the higher layer protocols.

Since the byte transmit time for the UART is large when compared to the cycle times of personal computer microprocessors, it is very beneficial for the processor to handle transmission and reception in the background while the processor performs other tasks. This can be accomplished in one of two ways, The first is on an interrupt basis: the UART interrupts the processor when it can accept another byte or has a received byte available. The processor processes the byte and returns to its tasks. The second, and better method, is to employ direct memory access (DMA). The processor sets up a buffer in memory and either transmits the buffer or receives bytes into the buffer by means of a dedicated DMA controller. The UART signals the DMA controller when it has space or a byte available. DMA uses no processor power and only requires bus bandwidth to complete the task. It is possible, though difficult, for a transmitting station to build the entire frame in memory and send it to the UART via DMA. The same is not true for a receiving station. Because it is impossible to determine the exact length of a frame without parsing it (there is no fixed frame length or frame length included in the frame header in the IRLAP), there is no way to determine when an entire frame has been received if using DMA. The only solution is to poll the receive buffer, which eliminates the advantages DMA offers because it requires processor time.

In practice, the best solution currently available is to transmit and receive frame bytes based on interrupts. Flag insertion and transparency are handled within the interrupt routine, and frame check sequences are calculated as the bytes are transmitted and received. For the most part, this solution is acceptable for high-powered personal computers.

The solution is unacceptable, however, for lower cost peripherals, for example process bound laser printers. Infrared communication was chosen primarily for its low cost. For adapters to maintain such pricing, they must rely on lesser-powered microprocessors which may be easily overwhelmed by the enormous amount of IRLAP overhead. Even higher powered peripherals may not have the bandwidth available to properly service the infrared link layer. The processor must waste cycles handling frame construction and parsing, and has no DMA to assist in moving data bytes off the port. A better means of handling data link layer information is required.

SUMMARY OF THE INVENTION

A principal object of the present invention is to provide apparatus which allows lower-performance peripherals to communicate more efficiently and at higher asynchronous data rates than normally would be possible when connected via the Infrared Data Association's Serial Infrared Link Access Protocol (IRLAP).

Another object of the present invention is to provide means, as a hardware assist, which may accommodate existing personal computers, and modified peripherals, such as low cost printers, which will permit the use of direct memory access (DMA) without the necessity of polling.

An IRLAP hardware-assist block inserted between the UART and processor bus solves data link layer performance and overhead problems. By providing services to handle the four tasks needed to build an IRLAP frame from a data block, the processor is relieved of its low-level duties.

The current state of the art makes it difficult for peripherals to communicate at high speeds with highly powered mobile personal computers. The improvements in the infrared hardware architecture described here shifts the burden of low level communication to a dedicated DMA controller and removes much of the overhead in preparing and parsing IRLAP frames. This significantly reduces the processor load currently required by IRLAP communication.

Other objects and a more complete understanding of the invention may be had by referring to the following description taken in conjunction with the accompanying drawings in which:

DESCRIPTION OF THE ILLUSTRATIVE EMBODIMENT(S)

Figure 1:
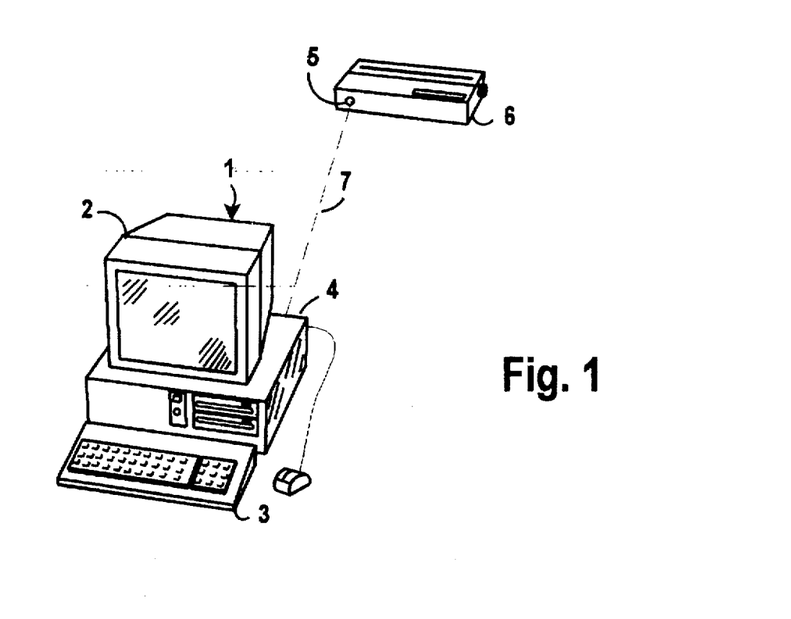
FIG. 1 is a schematic perspective view of a personal computer and printer incorporating an IRLAP hardware-assist apparatus inserted between the UART and processor bus of each of the machines to facilitate infrared communications therebetween.

Environment Apparatus:

Turning now to the drawings, and especially FIG. 1 thereof, a personal computer 1, including monitor 2, keyboard 3 and case or housing 4 for holding therein a conventional microprocessor, memory (e.g. RAM, both static and dynamic), mother and auxiliary (daughter) boards as well as hard and soft drives. A printer 6 is schematically shown remotely positioned from the computer 1, each of the computer and the printer 6 include an infrared detector-receiver-transmitter (such as the infrared optical receiver/transmitter 5 on the printer 6) to provide infrared communication along IR path 7 there-between. The personal computer may be of any kind which has slots or the like therein (not shown) to accommodate auxiliary (daughter) boards, such as an infrared assist apparatus constructed in accordance with the present invention, and meeting the IRLAP standards. The printer 6 also contains a microprocessor for implementing the various functions found today in modern printers. Preferably, a similar IRLAP assist apparatus found in the personal computer is also contained in the printer, the dissimilarities being only due to the difference in type of microprocessor employed in the two machines. Both machine processor implementations include the capability of DMA (direct memory access) control. Additionally, each processor includes, besides conventional bussing etc., a universal asynchronous receiver/transmitter (UART). In the example used in the specification hereinafter, a 16550 UART is employed.

IRLAP (Serial Infrared Link Access Protocol):

In a typical infrared implementation, the processor of the sending system wraps the data in an IRLAP frame before sending it to the UART for transmittal. Similarly, the receiving system must unwrap the frame it receives from its UART to access that data the frame contains. The IRLAP Encode/Decode function block allows the system to operate as a UART again, in that the data the processor sends or receives is the raw data, free of IRLAP frame wrappers and encoding.

Figure 2A:
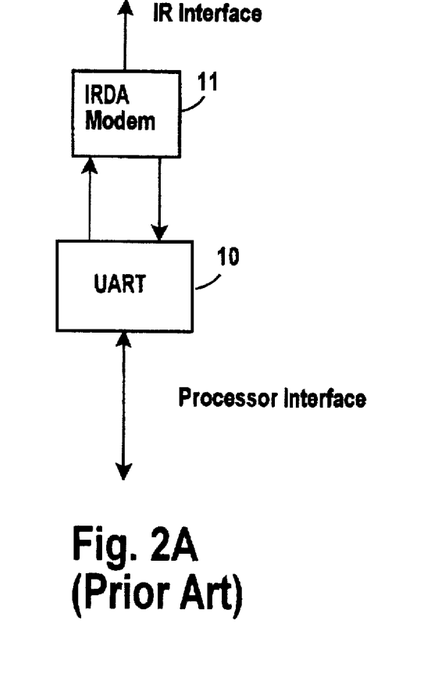
FIG. 2A is a schematic block diagram of a typical prior art infrared communications scheme utilizing the Infrared Data Association's Serial Integrated Link implementation.
Figure 2B:
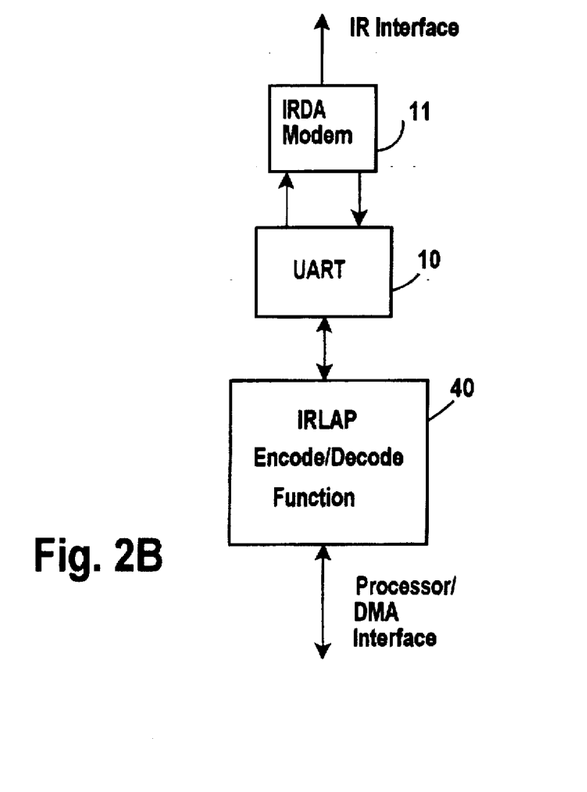
FIG. 2B is a very high level block diagram illustrating the difference between the implementation of FIG. 2A and the present invention.

FIG. 2 illustrates the differences between the typical IRDA implementation and the improved version constructed in accordance with the present invention.

In the typical implementation, as shown in FIG. 2A, the data passed to the UART 10 from the processor interface must already be framed according to the IRLAP. Similarly, data received through the UART 10 from the IR Modem 11 requires stripping and transparency translation before it can be used. In the improved version, the IRLAP hardware assist block 40 processes data into an IRLAP frame structure for transmittal via the UART. Conversely, the hardware 40 interprets frames received by the UART and passes only the data the frames contain to the processor/DMA interface.

Figure 3:
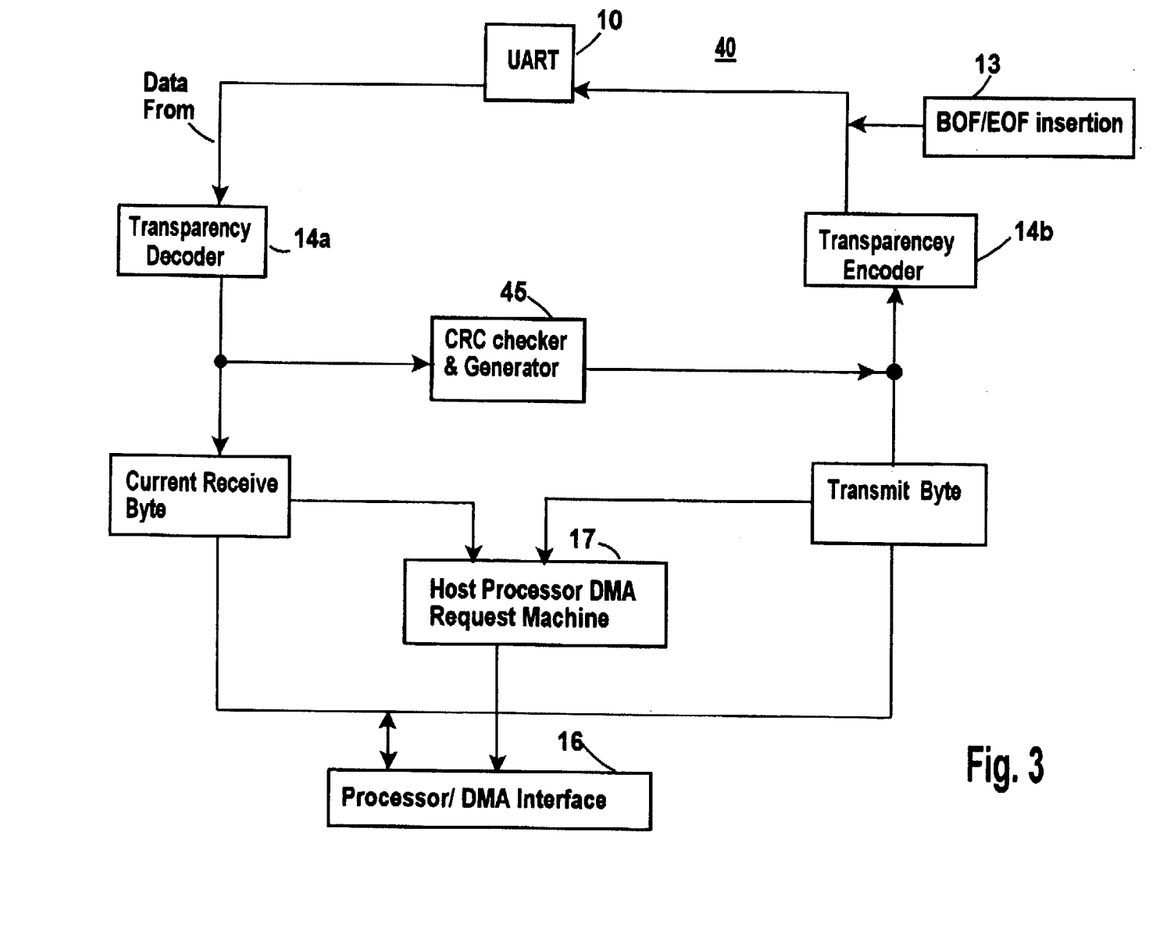
FIG. 3 is a high level diagram illustrating the functional operation of apparatus constructed in accordance with the present invention.

A high level block diagram of the IRLAP hardware block 40 is shown in FIG. 3. The IRLAP hardware block provides both an interrupt and a DMA interface for the IR hardware. The DMA channel is used for data transfer, while the interrupt is used to provide information about special transmit and receive conditions. This allows the processor to service the data link layer only when necessary. As a functional overview, the hardware block automatically performs these services:

1. Beginning of frame (BOF) flag insertion/deletion block 13. A programmable number of BOF's are inserted when the first transmit data byte of a frame is written to the IR hardware. After these have been sent to the UART 10, the data bytes are sent for transmission. During reception, the assist block strips all leading BOF's to eliminate the need for parsing the data frame.

2. Automatic transparency. During transmission, the hardware schematically illustrated in block 14b handles transparency by replacing data bytes with a special two byte sequences as necessary. On reception, hardware represented by block 14a replaces the two byte sequences by the data byte they represent.

3. Frame Checksum Sequence insertion/checking. As data bytes are written to the hardware, a frame checksum is calculated on the data using, for example, a linear feedback shift register 46 which is part of a CRC checker and Generator 45, discussed hereinafter with respect to FIG. 4. When no more bytes are written to the hardware for a programmable time period, the hardware writes the checksum to the UART. During frame reception, a checksum is calculated on the incoming bytes and is compared with the transmitted checksum to assure data integrity.

4. End of frame flag (EOF) insertion/deletion 13. An EOF flag is written to the UART after the Frame Checksum Sequence to signify the end of frame. The EOF flag is stripped during reception 5. Status interrupts. The hardware can interrupt the microprocessor when a special condition is detected during communication that requires servicing the DMA controller (end of frame, aborted frame, or bad checksum).

These five services allow the infrared IRDA modem 11 to transmit by simply pointing a host processor DMA request machine 17 (DMA Controller) to the proper area of memory containing the transmittable data. The hardware handles all of the IRLAP overhead. During reception, the microprocessor can use DMA to receive frames directly into memory. The hardware notifies the processor when a condition exists that requires attention, such as the completion of a frame.

IRLAP frame:

An IrLAP frame is comprised of:

1) Beginning of Frame Flag(s)(BOF, hC0$^2$),
2) Address Byte;

3) Command Byte;
4) Information Byte(s);
5) Frame Checksum (16 Bit)
6) End of Frame Flag (EOF, hC1).

[2] In the table which follows, h=hex. Therefore, for example, hC0 is 192 decimal.

Since the BOF and EOF are reserved byte values, any time these byte values are present in parts 2–5 they must be encoded so that data values are not confused with special bytes. This is accomplished in IRLAP by a character transparency mode. Character stuffing is employed, in which a reserved value occurring in the data stream is replaced by a control-escape (CE) byte, h7D, and then a modified version of the reserved value. This modification is accomplished by complementing bit 5 of the value, or performing an XOR with h20.

A sample IRLAP frame is shown below in table format, with and without encoding. It is believed that this will aid the reader in understanding of the functions which must be provided by the hardware of the present invention.

| Unencoded Frame | | Encoded Frame | |
| --- | --- | --- | --- |
| hC0 | Beginning of Frame | hC0 | BOF |
| hC0 | Beginning of Frame | hC0 | BOF |
| h52 | Address | h52 | Address |
| h56 | Command | h56 | Command |
| h03 | First Information byte | h03 | First Information Byte |
| h45 | | h45 | |
| h7D | Reserved Value | h7D | Control-Escape |
| | | h5D | Complemented Byte |
| h30 | | h30 | |
| hD0 | | h00 | |
| hC1 | Reserved Value | h7D | Control-Escape |
| | | hE1 | Complemented Byte |
| h80 | | h80 | |
| h40 | Last Information Byte | h40 | last Information Byte |
| h03 | Frame (checksum, LSB | h03 | Frame Checksum, LSB |
| h02 | Frame (checksum' MSB | h02 | Frame checksum, MSB |
| hC1 | End of Frame Flag | hC1 | EOF |

Figure 4:
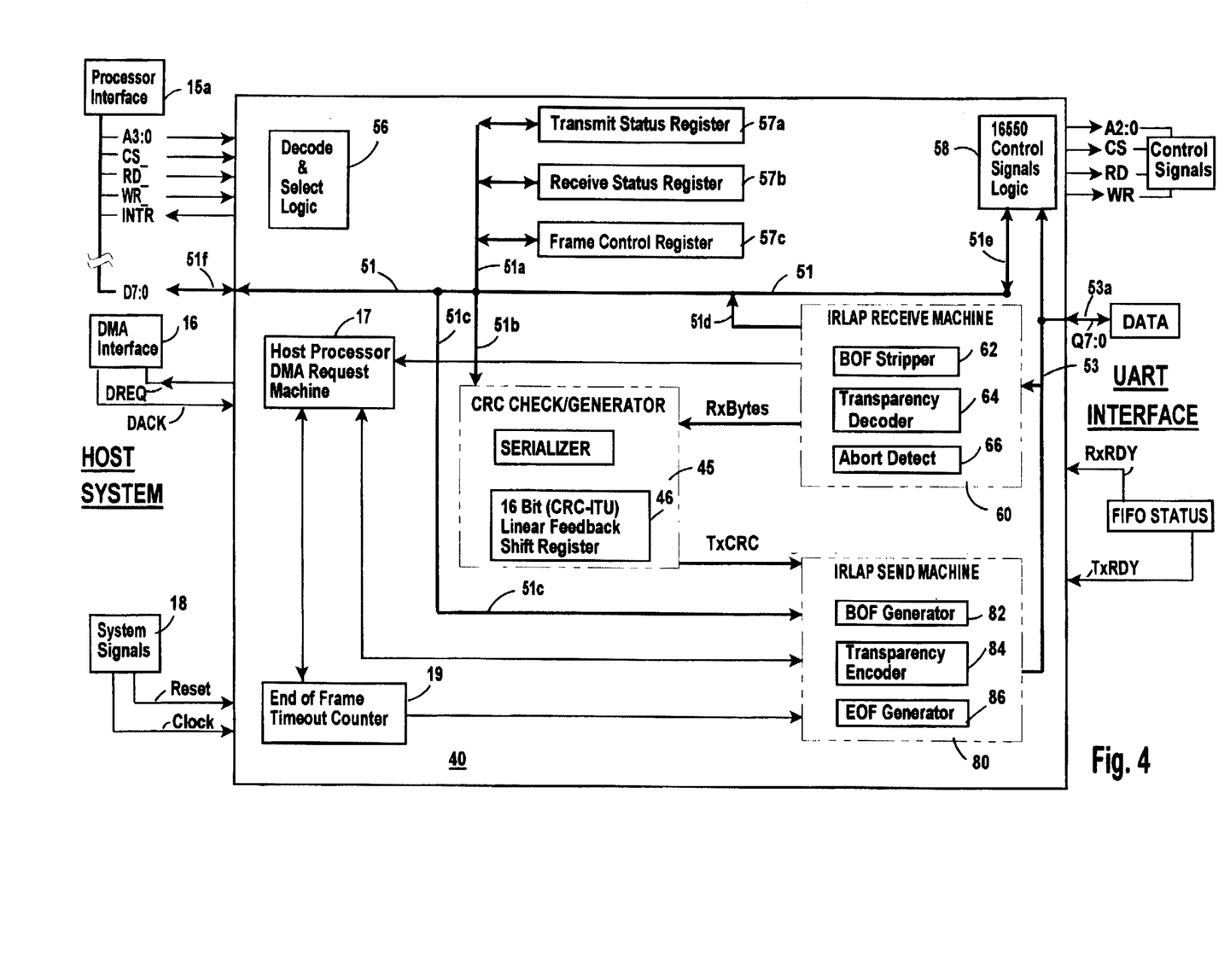
FIG. 4 is a block diagram illustrating at a high level, selected parts of the inventive assist apparatus, data and various signals employed to meet the IRLAP (Infrared Link Access Protocol)

IRLAP Hardware Assist:

FIG. 4 is a more detailed representation of the general diagram shown in FIG. 3. FIG. 4 shows, from a hardware standpoint, the individual blocks that comprise the IRLAP Encode/Decode function. This is the hardware assist apparatus that fits between the host processor system and the 16550 UART that performs the IRLAP translation for the processor. As shown In FIG. 4, an IRLAP Receive Machine 60 (shown schematically in phantom lines) handles data from the 16550 UART and translates it into data usable by the processor.

The IRLAP Send Machine 80 (also shown schematically in phantom lines in FIG. 4) takes data from the machine processor, converts it to the IRLAP protocol format and then sends it to the UART. Both of these machines are set forth in greater detail in FIG. 5 and FIG. 7 respectively. Other blocks in FIG. 4 are either generally known pieces of hardware, such as the CRC Check/Generator 45 which is normal hardware for generating and checking cyclical redundancy. Other conventional apparatus such as the Host Processor DMA Request Machine 46, details of which depend on the type of processor being interfaced. The heart of the design is in the receive and send machines, 60 and 80 respectively. The wider paths (lines) represent busses (e.g. 51, 53) which show the flow of data involved between the Host System data processor and the UART. The transmit data presented to the UART comes from the IRLAP send machine 80. Received data is fed from the UART to the IRLAP receive machine 60. The UART data flows into and out of the hardware assist 40 through Q7:0 via branch bus 53a to bus 53 on the UART interface side (right side) of FIG. 4.

In order to give a better overall understanding of the general flow of what communicates to what and how the data and signals interact, the following overview is presented: In FIG. 4, the Host system, for example the personal computer 1 shown in FIG. 1, includes a data processor interface 15a, which along with the DMA interface 16 couples the Host processor DMA Request machine 17, and appropriate system signals 18, e.g. Reset and Clock, which provide the necessary inputs for the hardware assist 40.

Turning now to the Processor interface 15a, while the example 16550 UART requires 3 bits of address space, A3:0 is 4 bits of address space with the one extra address bit employed to address registers within the assist block. CS__ is a Chip Select signal; RD__ is a read signal;. WR__ is a write signal, and INTR is an interrupt signal back to the processor. D7:0 is the data in and data out for the data path 51 for the Host system side of the drawing. The Decode and Select Logic block 56 is for performing address decodes to select, knowing when it needs to talk, and what data is directed to it. These are minor codes that go to the registers and receive machine. The three registers "Transmit Status Register" 57a, "Receive Status Register" 57b, and "Frame Control Register" 57c are basically informational. For instance, in the frame control register 57c is the number of beginning-of-frame flags (BOF) values that are appended to the beginning of any frame and the programmable number that is set in that register. The receive status register 57b informs whether a good frame, an aborted frame, or the previous frame had a bad CRC. The transmit status register 57a does the same thing for transmission as the receive status register 57b does for receiving.

The data path 51 goes to each register by way of bus 51a as well as the CRC Check/Generator 45 via bus 51b. The IRLAP receive machine 60 and the IRLAP send machine 80 are coupled to the data BUS 51 through branch busses 51c and 5d, which also are connected to the 16550 Control Signals Logic 58 via bus 51 extension 51e. Because the IRLAP assist apparatus 40 needs to generate signals for enabling communication with the 16550 UART, and the data path is separated, the 16550 Control Signals Logic 58 acts as a bridge or conduit between the two data paths 51 and 53. The 16550 Control Signals Logic 58 takes data that is intended to be written to the 16550 and generates the appropriate signals to write to the 16550. The outputs of the 16550 control logic signals block 58 are CS (chip select for the UART), RD (read), WR (write) and A2:0, address signals. In a like manner, the 16550 control logic signals block 58 also performs reads from the 16550.

With regard specifically to the addressing signals A2:0, as previously set forth relative to the input A3:0, there are 3 bits of address space for commands defined for the 16550 UARTs, (the fourth being for registers 57a, 57b and 57c in the IRLAP assist apparatus 40). The lower three bits of the four are carried through to the 16550. In other words A3:0 has 4 bits of address space of which eight locations or 3 bits are devoted to addressing the 16550 itself, therefore the indication of A2:0.

The receive machine 60 has a beginning-of-file (BOF) stripper 62, a transparency decoder 64, which with its counterpart 'transparency encoder' 84 will be more fully explained hereinafter, and an abort detector 64, which detects an abort and transmits the information back to the host processor. The same thing is true of the send machine 80, except that the BOF Generator 82 adds a BOF signal to the frame, transparency encoder 84 and EOF generator 86 serve the expected functions or the reverse of the receive machine 60 functions.

At this time it may be well to note that since the BOF and EOF are reserved byte values, any time these byte values are present in 1) Address Bytes, 2) Command Bytes, 3) Information Byte(s), 4) Frame Checksums, they must be encoded so that data values are not confused with these special bytes. By way of review, this function is accomplished in IRLAP by a character transparency mode. Character stuffing is employed, in which a reserved value occurring in the data stream is replaced by a control-escape (CE) byte, h7D, and then a modified version of the reserved value. This modification is accomplished by complementing bit 5 of the value, or performing an XOR with h20. This makes the process completely reversible because the decoding can occur by simply complementing again bit 5 of the value or performing an XOR with h20. (For informational purposes, Rx=receive bytes and Tx=transmit bytes.)

The Host Processor DMA Request Machine 17 (DMA Controller) generates the request logic for which the processor DMA controller is to respond. When nothing is sent by the end of the frame, End of Frame Timeout Counter 19 appends an EOF to the frame.

For informational purposes, in most processor systems, the Direct Memory Access (DMA) controller involves only two control signals. The first, DMA request (DREQ), is generated by the external device. The signal is driven active any time a transfer is needed. The second, DMA acknowledge (DACK), is generated by the DMA controller. It is driven active whenever the data currently on the bus is for the requesting device (in the case of writes) or the DMA controller is ready to receive data from the device (in the case of reads).

DMA pacing in this invention can be handled by driving DREQ active whenever a byte is needed for encoding/transmitting or when a byte is available after decoding/receiving. It is driven inactive when the DMA controller responds with DACK. Rounding out FIG. 4, the FIFO (first in, first out) standard signals from the 16550 UART are RXRDY_ "receive is ready", and TXRDY_ "transmit is ready".

Figure 5:
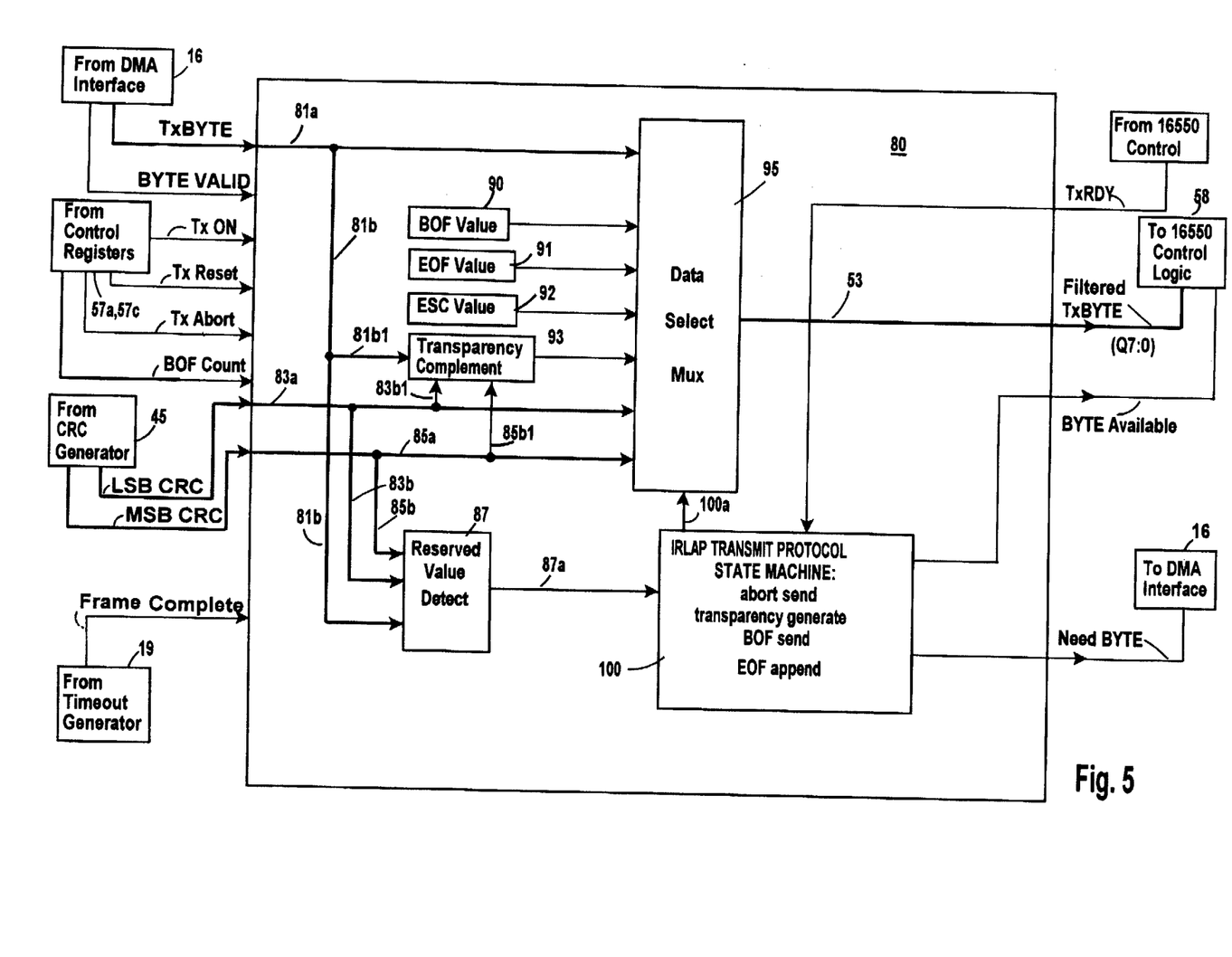
FIG. 5 is a schematic block diagram of an IRLAP transmit or send machine for the hardware assist apparatus constructed in accordance with the present invention and as shown in FIG. 4.

IRLAP Send or Transmit Machine:

FIG. 5 is a more detailed schematic block representation of the IRLAP Send Machine 80, including a variety of input signals. First from the DMA interface 16 is a transmit byte TxBYTE, which is the data intended to be transmitted, and a signal BYTE VALID indicates that the byte(s) are valid. From the Transmit Status Register 57a and Frame Control Register 57c (FIG. 4), basic information is provided. For example, from the Transmit Status Register 57a, transmit status information such as "is the transmitter on", TxON, or is there a need to reset the transmitter TxReset, and from Frame Control Register 57c, is there a need to generate an abort TxAbort, or how many beginning of frame (BOF) flags are required for appending at the beginning of the frame, (i.e. BOF count). This is the kind of information that the transmit or send machine needs to know to fullfill its function. From the CRC generator 45, the Send machine 80 needs to know the 16 bit CRC value (LSBCRC, MSBCRC) that needs to be appended to the frame before the end of frame (EOF) flag. Finally, the frame complete signal from the Timeout Generator 19 (FIGS. 4 & 5) to know that it is time to send the EOF flag and end the frame.

Figure 6:
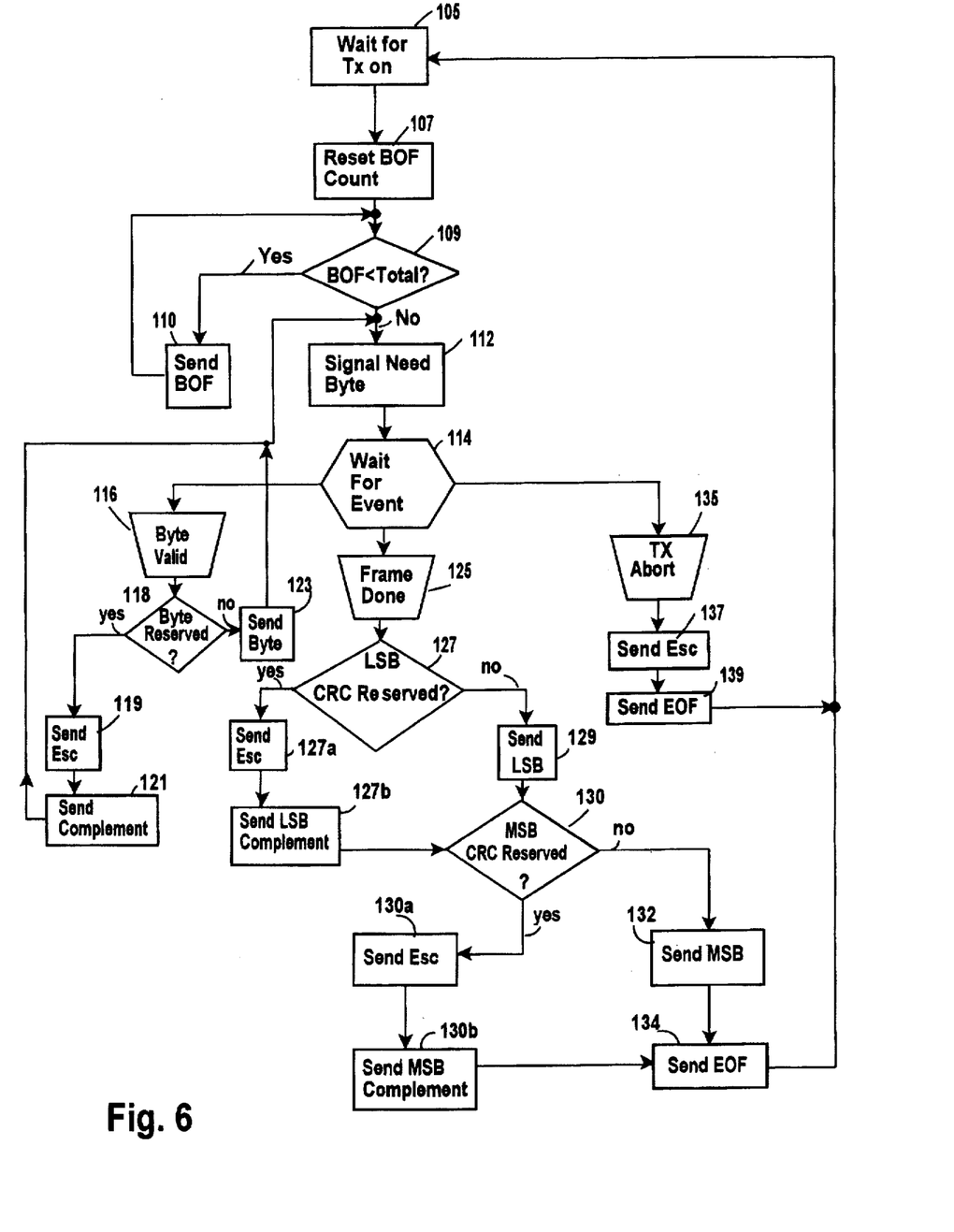
FIG. 6 is an IRLAP transmit protocol state machine showing a state machine for the transmit machine of FIG. 5.

The possible data values that will actually be transmitted are either derived from the TX byte or from the least significant byte LSB or from the most significant byte MSB of the CRC. Notice that TxBYTE, LSBCRC and MSBCRC are all passed to busses 81a, 83a and 85a, which through lines 81b, 83b, and 85b are passed to the reserved value detect block 87 for generating a signal as to whether the value currently on that BUS is reserved by IRLAP. In other words, is an EOF, a BOF or ESC character being passed? If so, it needs to be replaced by the escape code and its transparent value. The output from the reserved value detect block 87 will be passed to the Transmit Protocol State Machine 100, which is illustrated in FIG. 6. The only thing this transmit machine needs to generate is the data that is actually sent to the UART for the next byte, i.e. on bus 53 the "Filtered TxBYTE". The Transmit Protocol State Machine 100 generates the control signal on line 100a to the Data Select Multiplexer 95 to select which of the possible 7 values that will be sent to the UART next over bus 53. The first possibility is the raw data byte ( the TXBYTE) over bus 81a. The second possibility is that a BOF flag, "BOF Value" 90 is needed. The third is the EOF, ("EOF Value" 91), the fourth is the "ESC value" 92 and the fifth value is the "Transparency Complement" 93. The other possible sources, in addition to the TxBYTE source via bus 81b and branch 81b1, for the "Transparency Complement" 93, are the CRC's if they happen to be a reserved value. The sixth and seventh sources are the least significant bytes LSB and most significant bytes MSB of the CRC itself by way of branch lines 83b1 and 85b1 respectively.

As set forth heretofore, the IRLAP Transmit Protocol State Machine 100 determines which of these seven signals the Data Select Multiplexer 95 sends to the 16550 over bus 53. It is sent out as a filtered TxBYTE, and becomes Q7:0 on FIG. 4. The other two signals that the IRLAP Transmit Protocol State Machine 100 needs to generate is one that a "BYTE (sic: is) Available" signal to the 16550 UART and the other is a "Need BYTE" signal back to the DMA interface 16.

IRLAP Transmit Protocol State Machine:

The IRLAP Transmit Protocol State Machine 100 is a functional block diagram flow chart of what the hardware is performing within the Transmit Protocol State Machine. In other words, how it determines signals and what data to send through the Data Select Multiplexer 95.

Referring now to FIG. 6, input starts at the block 105 "Wait for TX On". This signal can include a wait for the transmitter to be on and then wait for a transmit start command. When the transmitter is set on, the beginning of frame count is reset as in block 107. If the beginning of frame count that is being kept track of is less than the total number of BOF that is to be sent, which is information gained from the Control Register, the BOFis sent, the count is incremented and looped until the BOF count is equal to the total desired to be sent. This is accomplished in decision block "BOF<TOTAL?" 109, and increment counter "Send BOF" 110. Then, the DMA controller (Host Processor DMA Request Machine 17) is signaled "Signal Need Byte" in block 112, that a byte is needed and in block 114 "Wait For Event" to occur.

There are one of three events that can occur. These events can come from either the Frame Control Register 57c, the DMA Interface 16 or from the Timeout Generator 19. If the DMA interface comes back with an indication that it has a valid byte ("Byte Valid", block 116), a check is made to determine if the byte is reserved, as in decision block 118, which is the signal that is passed from bus 87a and the Reserved Value Detect 87 in FIG. 5. If it is, then the escape code is sent as in block 119, and the complement in block 121. The loop is completed by going back to block 112 and the process is continued. If in decision block 118 it is determined that the Byte Valid is not a reserve value, then the raw byte is sent (block 123) and a signal is sent to block 112 that another byte is required.

The second possible event is that a "Frame Done" (block 125) signal is received from the Timeout Generator 19. When that occurs, the CRC and then the EOF flags are sent. The first thing sent is the least significant byte (LSB) which is checked to determine if it is a reserved value, decision block 127. If it is, send the escape (block 127a) followed by the complement (block 127b). If not, just the byte itself is sent (block 129). Then the most significant byte (MSB) is checked in decision block 130 to see whether it is reserved. If it is, it sends the escape code (block 130a) followed by the complement (block 130b) of the most significant byte MSB. If it is not, then the most significant byte at block 132 is sent. In either event, an EOF signal (block 134) is sent and the machine loops back to wait for TxON at 105.

The last event in the waiting loop is that a transmit abort ("Tx Abort, block 135) signal is received from the Transmit Status Register 57a. The processor, by way of example, for some reason or other does not want to send this frame and it needs to abort the frame. In that case, the abort signal is formed by sending an ESC (block 137) followed by an EOF (block 139). Again, the EOF signal is looped back to block 105 to wait for the transmit to begin again.

Figure 7:
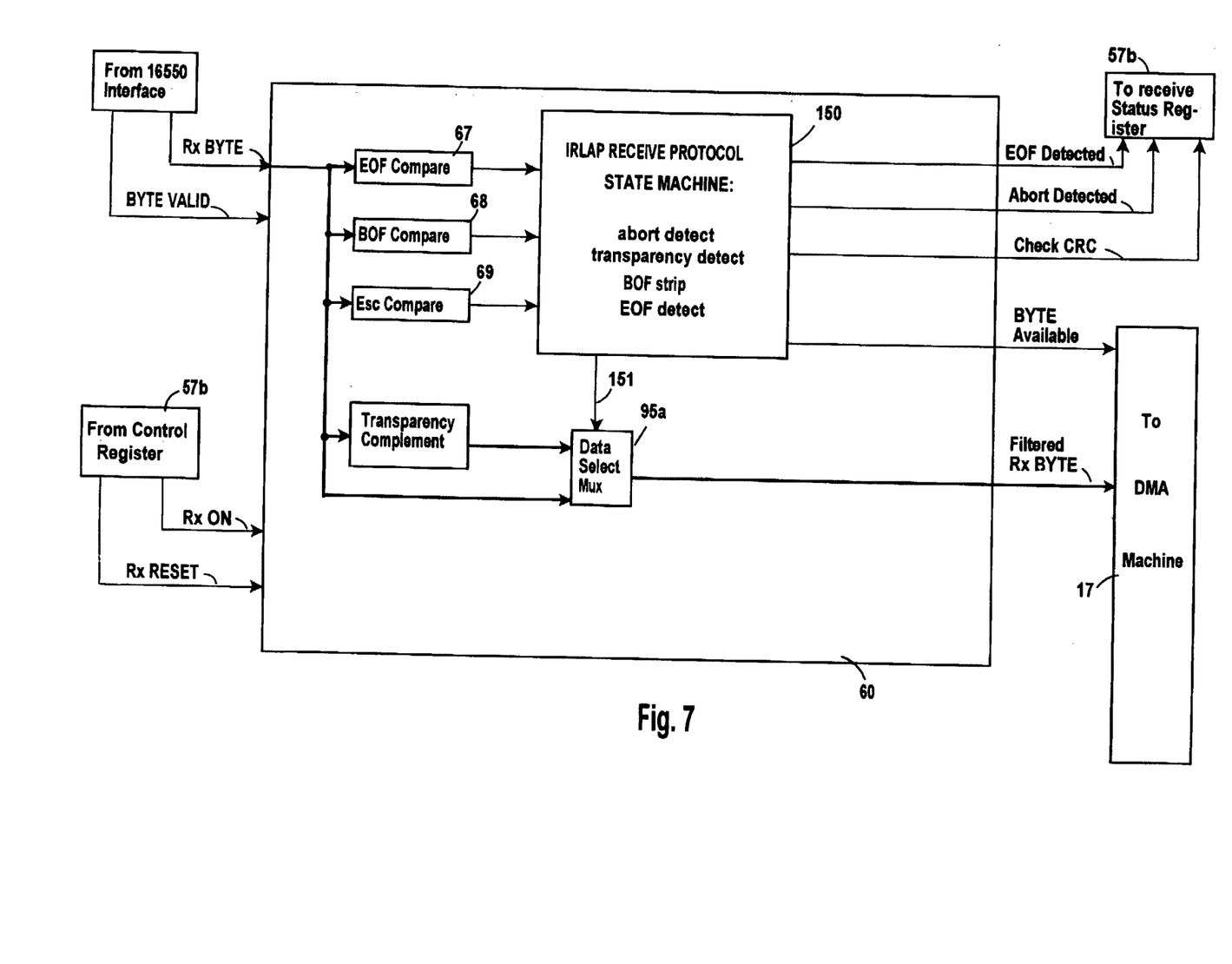
FIG. 7 is a is a schematic block diagram of an IRLAP receive machine for the hardware assist apparatus shown in FIG. 4, and constructed in accordance with the present invention.

IRLAP Receive Machine:

Referring now to FIG. 7, in the IRLAP Receive Machine 60, data flows from left to right. On the left, from the UART or 16550 Interface all that is being received is the receive byte (RxBYTE) and the signal that indicates that the incoming byte is valid (BYTE VALID). From the control register Receive Status Register 57b, we need to know that the receiver is on and that the Receive Machine 60 is monitoring the UART for the signals. The data byte from the 16550 UART, that is the received byte, is applied to several comparators, i.e. "EOF Compare" 67, "BOF Compare" 68, and "ESC Compare" 69. These comparators tell whether the received byte is a special value such as the beginning of frame (BOF) byte, end of frame (EOF) byte or escape (ESC) value, and are fed into the IRLAP Receive Protocol State Machine 150 so that it knows what functions it must select to implement. The IRLAP Receive Protocol State Machine 150 will be more fully described with reference to FIG. 8. Suffice at this point, and as shown in the box 150 in FIG. 7, these functions include, "abort detect", "transparency detect", "BOF strip", and EOF detect". The IRLAP Receive Protocol State Machine 150 selects a signal over bus 151 to the "Data Select Mux" 95a and what is being sent back to the DMA Machine, the Filtered RXBYTE, is only one of two cases: the byte is either the original data byte not modified from the 16550 UART or the transparency complemented version of that byte. So at the Data Select Multiplexer 95a, a choice is made as to which of these bytes will be shown to the host processor via the DMA machine. The "brain" of the receive machine again is the IRLAP Receive Protocol State Machine 150 and it generates several signals. The first three signals on the right all go to the Receive Status Register 57b (see FIG. 7 and FIG. 4) These are the special conditions that will now be discussed.

One of the special conditions is the detection of end of frame (EOF Detected); the next is detection of an abort (Abort Detected) and the last one is a signal to check the CRC value (Check CRC). At the end of the frame, the CRC value is looked at by the CRC Check/Generator 45 in FIG. 4 to insure that the CRC value matches that which has been obtained for the frame and is good. The last signal is the Byte Available signal which goes to the DMA Machine 17 indicating that the filtered RX byte should be transmitted back to the processor.

Figure 8:
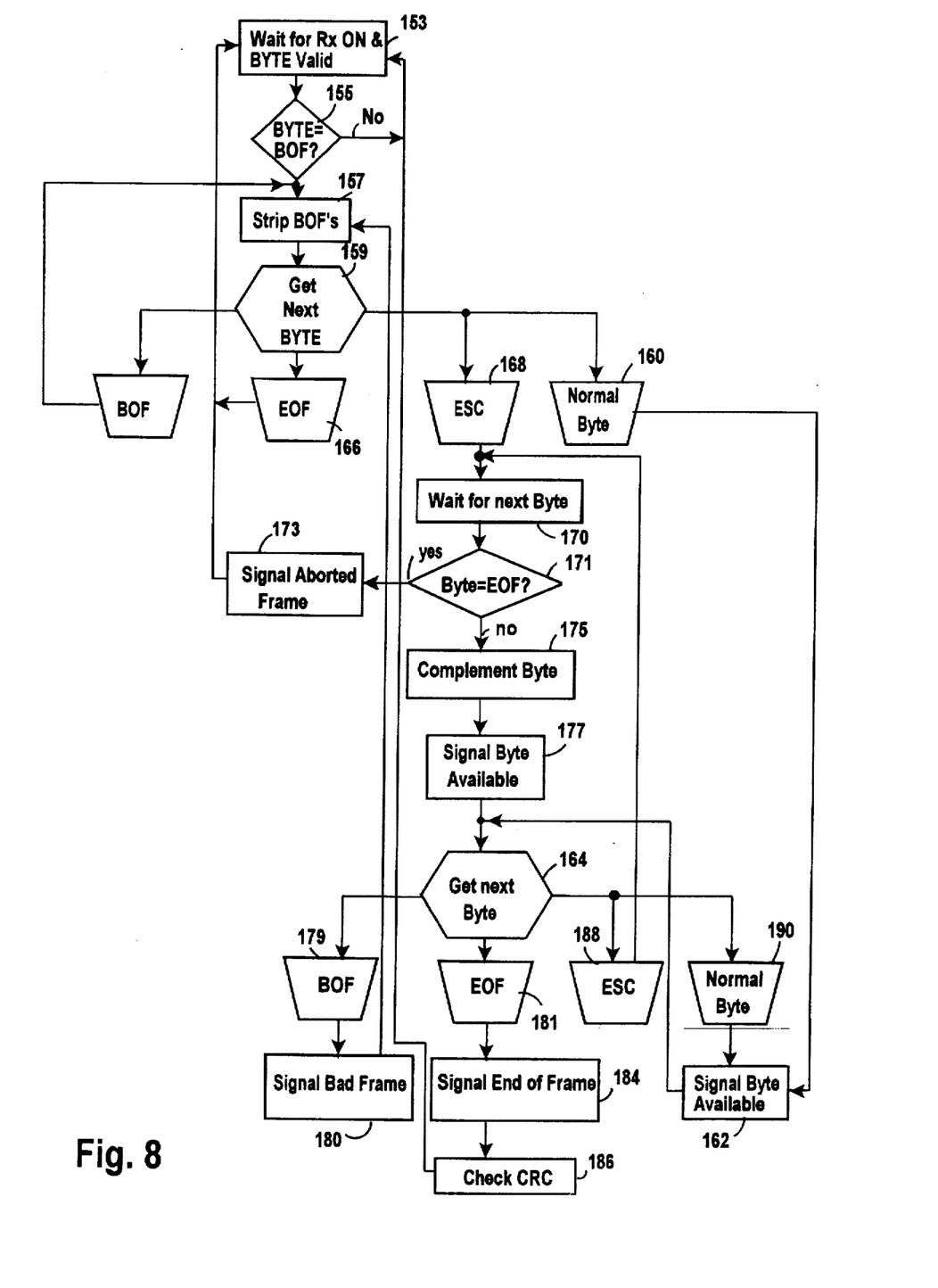
FIG. 8 is an IRLAP receive protocol state machine, similar to the state machine of FIG. 6 but for the receive machine of FIG. 7.

IRLAP Receive Protocol State Machine:

FIG. 8 is the IRLAP Receive Protocol State Machine 150 which is the brains of the IRLAP Receive Machine 60. Fundamentally, the IRLAP Receive Protocol State Machine 150 undoes what was done in the send machine. Another way of looking at the State Machine 150 is that it is a functional block diagram flow chart of what the hardware is performing within the IRLAP Receive Protocol State Machine 150. In other words, how it determines signals and what data to send through the Data Select Multiplexer 95a. Starting first at functional block 153 of FIG. 8, the machine waits for a signal indicating that the receiver is on and it has received a Byte Valid. If the byte received is the beginning of frame flag BOF, as indicated in the decision logic block 155, then the byte is presented to logic block 157, Strip BOF or strip the beginning of frame. If it is not, the logic block 153 continues to wait for a valid byte and a byte indicating beginning of frame.

Once a beginning of frame byte has been found, the BOF is stripped. This means the logic waits for a BOF until it falls through to get the next byte. If that byte is still a BOF, it is also stripped and the machine continues on to block 159 to get the next byte. Fundamentally, the beginning of frame byte is ignored. That way the beginning of frame bytes are stripped off and not sent to the processor since no byte available signal needs to be generated. If the next byte is a normal byte, i.e. other than an EOF, and ESC or BOF, (which is the far right condition as indicated in block 160) a signal that the byte is available is sent as indicated in block 162 and it loops back to the "Get Next Byte" block at 164 shown in the lower portion of the drawing. In passing it is noted that block "Get Next Byte" block 164 only is operative when data is being passed from within the frame.

At the outset, if in logic block 159 an end of frame EOF byte is encountered, as shown in logic block 166, the path loops back to the "Wait for Rx ON and BYTE Valid" block 153. If an escape sequence is encountered as the next byte, as in logic block 168, the next byte is determinative of any action that should be taken and so "wait for next Byte" 170 is the indicated action. If the next byte is an EOF, as shown in decision block 171 then that means consecutive escape and EOF bytes were received and the frame has been aborted as in block 173. Under these circumstances, the aborted frame is signalled and the receiver is reset back to block 153. If the byte is not an end of frame, i.e. the answer to the logic query in block 171 is no, it means that the byte received is a transparency character (an escape code followed by a special byte). Since the byte is not an EOF byte, the byte is complemented as in step 175 and a "Signal Byte Available" 177 is sent to the Data Select Mux 95a (FIG. 7).

At the lower Get Next Byte block 164, (and this is well within a frame), there are four possibilities when a new byte is obtained. The first is a beginning of frame signal BOF is received, as at block 179. That means that somehow the end of frame (EOF signal) was missed for the previous frame so a signal is sent, as at 180, that it was a bad frame and the receiver is reset as at 157. Another possibility is that the end of frame character is received as indicated in block 181. In that instance, as indicated at 184, the end of the frame is signalled, and the CRC should be checked as at 186 to make sure it is good.

Another possibility is the escape sequence. When the escape sequence code is detected, as at 188, a loop is made up to the same abort detect logic previously mentioned and wait for the next byte as at 170 and go through the same logic loop dictated heretofore. The last condition is, if it is a normal byte, such as at block 190, a signal that the byte is available as at 162, and wait for the next byte as at 164. As may be recognized, what has been formed is one big continuous loop that starts with a BOF and eventually ends with either an error condition or an EOF, which means that it was a good frame.

Thus the improved hardware of the present invention shifts the burden of low level communication to a dedicated DMA controller and removes much of the overhead in preparing and parsing IRLAP frames. This significantly reduces the processor load currently required by IRLAP communication, which allows lowerperformance peripherals to communicate more efficiently and at higher asynchronous data rates than normally would be possible when connected via the Infrared Data Association's Serial Infrared Link Access Protocol (IRLAP).

In summary, the present invention provides two strategic benefits: First, it allows lower-powered, less expensive microprocessors to effectively use IR communication, lowering the cost of infrared devices, and secondly and more importantly, it permits peripherals (such as laser printers) which cannot afford any extra processing burden, to become IRDA capable. These two advantages will make infrared communication links a possibility to many more devices throughout industry.

Although the invention has been described with a certain degree of particularity, it should be recognized that elements thereof may be altered by person(s) skilled in the art without departing from the spirit and scope of the invention as hereinafter set forth in the following claims.

What is claimed is:

1. Infrared Communication apparatus for machines incorporating at least microprocessor control and including direct memory access means, said machines including a UART and an infrared transmitter and receiver for communicating with other like equipped machines; said apparatus comprising, in combination:

an IRLAP receive machine for receiving data from said UART and translating said UART received data into data useable by said microprocessor; said IRLAP receive machine including means for stripping beginning of frame indications from frames after receipt of indications of beginning of frame;

an IRLAP send machine for converting data from said microprocessor into IRLAP data for conveyance to said UART, said IRLAP send machine including means for inserting beginning of frame indications in the frame being transmitted;

said receive and send machines being coupled to said direct memory access means for sending and receiving therefrom frames of information with limited processor interaction.

2. Infrared Communication apparatus for machines incorporating at least microprocessor control and including direct memory access means, said machines including a UART and an infrared transmitter and receiver for communicating with other like equipped machines; said apparatus comprising, in combination:

an IRLAP receive machine for receiving data from said UART and translating said UART received data into data useable by said microprocessor;

an IRLAP send machine for converting data from said microprocessor into IRLAP data for conveyance to said UART, said IRLAP send machine including means for inserting beginning of frame indications in the frame being transmitted and said IRLAP including means in said IRLAP send machine providing for a transparency mode to ensure that data values are not confused with flag or control bytes contained in said data elsewhere than where said control of flag bytes are expected in each frame;

said receive and send machines being coupled to said direct memory access means for sending and receiving therefrom frames of information with limited processor interaction.

3. Infrared Communication apparatus in accordance with claim 2 wherein said flag and control bytes are defined as special reserved bytes, including means in said transparency mode for encoding the occurance of said bytes in other than their expected position in each frame.

4. Infrared Communication apparatus in accordance with claim 3 including means in said IRLAP receive machine for decoding said encoded special reserve bytes to convert the same to data.

5. Infrared Communication apparatus for machines incorporating at least microprocessor control and including direct memory access means, said machines including a UART and an infrared transmitter and receiver for communicating with other like equipped machines; said apparatus comprising, in combination:

an IRLAP receive machine for receiving data from said UART and translating said UART received data into data useable by said microprocessor; an IRLAP send machine for converting data from said microprocessor into IRLAP data for conveyance to said UART, said IRLAP send machine including means for inserting end of frame indications in the frame being transmitted;

said receive and send machines being coupled to said direct memory access means for sending and receiving therefrom frames of information with limited processor interaction;

said apparatus including means for inserting a frame cyclic redundancy checksum prior to sending an end of frame flag.

6. Infrared Communication apparatus for machines incorporating at least microprocessor control and including direct memory access means, said machines including a UART and an infrared transmitter and receiver for communicating with other like equipped machines; said apparatus comprising, in combination:

an IRLAP receive machine for receiving data from said UART and translating said UART received data into data useable by said microprocessor;

an IRLAP send machine for converting data from said microprocessor into IRLAP data for conveyance to said UART;

said receive and send machines being coupled to said direct memory access means for sending and receiving therefrom frames of information with limited processor interaction;

wherein said IRLAP frame comprises, in the following order, at least a beginning of frame flag byte; an address byte; a command byte; an information or data byte; a frame checksum and an end of frame flag byte; and wherein said flag and control bytes are defined as special reserved bytes, and means, in said send machine, for creating a transparency mode for encoding the occurrence of said special reserved bytes in other than their expected order in each frame.

7. Infrared Communication apparatus in accordance with claim 6 including means in said IRLAP receive machine for decoding said encoded special reserve bytes to convert the same to data.

8. In a personal computer and at least one peripheral device for communicative connection thereto, said personal computer and said peripheral device each including a processor, memory, and direct memory access control, and a UART connected to the processor through a bus and to an infrared transmitter/receiver designed for light path communication between said personal computer and said peripheral device; wherein said personal computer contains communication hardware assist apparatus for relieving the processor of selected communication tasks externally of said personal computer, to and from said peripheral device, said communication hardware assist apparatus intermediate said processor and said UART and comprising; and wherein said peripheral device contains communication hardware assist apparatus for relieving the processor of selected communication tasks externally of said peripheral device, to and from said personal computer, said communication hardware assist apparatus intermediate the peripheral processor and the peripheral UART;

an IRLAP receive machine for receiving data sent by infrared from said peripheral to said UART and translating said UART received data into data useable by said processor;

an IRLAP send machine for converting data from said processor into IRLAP data for conveyance to said UART;

said receive and send machines being coupled to said direct memory access means for sending and receiving therefrom frames of information with limited processor interaction.

9. In a personal computer and at least one peripheral device in accordance with claim 8 wherein said peripheral device includes an IRLAP receive machine for receiving data sent by infrared from said personal computer to said UART of said peripheral device and translating said UART received data into data useable by said peripheral processor, and said communication hardware assist apparatus for relieving the processor of the peripheral device of selected communication tasks externally of said peripheral device, comprising a IRLAP receive machine for receiving data sent by infrared from said personal computer to said UART and translating said UART received data into data useable by said processor of said peripheral device; an IRLAP send machine for converting data from said processor of said peripheral device into IRLAP data for conveyance to said UART; said receive and send machines being coupled to said direct memory access means for sending and receiving to and from memory, frames of information with limited peripheral device processor interaction.

10. In a personal computer and at least one peripheral device for communicative connection thereto, said personal computer including a processor, memory, and direct memory access control, and a UART connected to the processor through a bus and to an infrared transmitter/receiver designed for light path communication with said peripheral device; and communication hardware assist apparatus for relieving the processor of selected communication tasks externally of said personal computer, to and from said peripheral device, said communication hardware assist apparatus intermediate said processor and said UART and comprising;

an IRLAP receive machine for receiving data sent by infrared from said peripheral to said UART and translating said UART received data into data useable by said processor;

an IRLAP send machine for converting data from said processor into IRLAP data for conveyance to said UART;

said receive and send machines being coupled to said direct memory access means for sending and receiving therefrom frames of information with limited processor interaction;

wherein an IRLAP frame comprises, in the following order, at least a beginning of frame flag byte; an address byte; a command byte; an information or data byte; a frame checksum and an end of frame flag byte; and wherein said flag and control bytes are defined as special reserved bytes, and means, in said machine, for creating a transparency mode for encoding the occurrence of said special reserved bytes in other than their expected order in each frame.

11. In a personal computer and at least one peripheral device in accordance with claim 9 including means in said IRLAP receive machine for decoding said encoded special reserve bytes to convert the same to data.

12. In a personal computer and at least one peripheral device in accordance with claim 10 wherein said IRLAP send machine includes means for inserting beginning of frame indications and end of frame indications in the frame being transmitted.

13. In a personal computer and at least one peripheral device for communicative connection thereto, said personal computer including a processor, memory, and direct memory access control, and a UART connected to the processor through a bus and to an infrared transmitter/receiver designed for light path communication with said peripheral device; and communication hardware assist apparatus for relieving the processor of selected communication tasks externally of said personal computer, to and from said peripheral device, said communication hardware assist apparatus intermediate said processor and said UART and comprising;

an IRLAP receive machine for receiving data sent by infrared from said peripheral to said UART and translating said UART received data into data useable by said processor;

an IRLAP send machine for converting data from said processor into IRLAP data for conveyance to said UART;

said receive and send machines being coupled to said direct memory access means for sending and receiving therefrom frames of information with limited processor interaction;

wherein an IRLAP frame comprises in the following order, at least a beginning of frame flag byte; an address byte; a command byte; an information or data byte; a frame checksum and an end of frame flag byte; and wherein said IRLAP send machine includes means for inserting beginning of frame indications and end of frame indications in the frame being transmitted.

14. A method of communication utilizing serial infrared link access protocol (IRLAP) between devices each containing a processor, memory, direct memory access to said memory, and universal asynchronous receiver/transmitters each connected to an infrared receiver/transmitter for sending informational data in the form of frames between at least two of said devices; said method comprising the steps of:

preparing frames for transmission from one of said devices to another of said devices by;

taking from memory by said direct memory access, informational data to be transmitted;

adding a beginning of frame flag marking the start of a frame;

defining special reserved bytes that if sent as data could be construed by the receiver to be control or flag bytes;

encoding said special reserved bytes when they appear in other than their expected position in each frame so that when transmitted are transparent to the receiver;

adding a frame checksum at the end of informational data being sent, and;

appending an end of frame indication to said frame.

15. A method of communication utilizing serial infrared link access protocol (IRLAP) between devices in accordance with claim 14 including the following steps;

receiving the frame in one of said devices to which said frame was transmitted;

stripping the beginning of frame indication from said received frame, decoding said encoded special reserved bytes, insuring data integrity by comparing said checksum to a calculated checksum.

16. A method of communication utilizing serial infrared link access protocol (IRLAP) between devices in accordance with claim 14 including the step of:

storing said informational data into the memory of said device by said direct memory access.

17. A method of communication utilizing serial infrared link access protocol (IRLAP) between devices in accordance with claim 16, including the step of:

stripping said end of frame indication from said frame prior to storage.

* * * * *